(12) United States Patent
Urata

(10) Patent No.: US 11,274,917 B2
(45) Date of Patent: Mar. 15, 2022

(54) METHOD OF MEASURING OPTICAL FIBER PREFORM

(71) Applicant: Shin-Etsu Chemical Co., Ltd., Tokyo (JP)

(72) Inventor: Yuhei Urata, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 17/213,213

(22) Filed: Mar. 25, 2021

(65) Prior Publication Data

US 2021/0215473 A1    Jul. 15, 2021

Related U.S. Application Data

(63) Continuation of application No. PCT/IB2019/058290, filed on Sep. 30, 2019.

(30) Foreign Application Priority Data

Sep. 28, 2018  (JP) .............................. JP2018-183352

(51) Int. Cl.
*G01B 11/08*    (2006.01)
*C03B 37/018*   (2006.01)
(Continued)

(52) U.S. Cl.
CPC ............ *G01B 11/08* (2013.01); *C03B 37/018* (2013.01); *G01B 11/2408* (2013.01); (Continued)

(58) Field of Classification Search
CPC ... G01B 11/08; G01B 11/2408; C03B 37/018; C03B 37/01446; C03B 2203/22; C03B 2207/50; C03B 37/01406; C03B 37/0142; C03B 2207/06; C03B 2207/20; C03B 2207/70; G01M 11/37; G02B 6/02; G02B 6/028

See application file for complete search history.

(56) References Cited

U.S. PATENT DOCUMENTS 5,961,682  A     10/1999  Lee
6,807,350  B2 * 10/2004  Soufiane ................ G02B 6/021
                                                       385/127
(Continued)

FOREIGN PATENT DOCUMENTS

CN    104876434 A    9/2015
JP    H0925135 A     1/1997
(Continued)

OTHER PUBLICATIONS (ISA/237) Written Opinion of the International Search Authority for International Patent Application No. PCT/IB2019/058290, issued/mailed by the Japan Patent Office dated Dec. 17, 2019.

*Primary Examiner* — Michael P LaPage

(57) ABSTRACT

A method of measuring a diameter of a core portion of an optical fiber preform including the core portion having a relatively high refractive index and a clad portion having a relatively low refractive index. The method includes applying parallel light to the optical fiber preform, and measuring the diameter of the core portion from an image captured by receiving the light having transmitted through the optical fiber preform.

4 Claims, 8 Drawing Sheets

(51) Int. Cl.
  *G01B 11/24*  (2006.01)
  *G02B 6/028*  (2006.01)
  *G01M 11/00*  (2006.01)
  *G02B 6/02*  (2006.01)

(52) U.S. Cl.
  CPC ............... *G01M 11/37* (2013.01); *G02B 6/02* (2013.01); *G02B 6/028* (2013.01)

(56) References Cited

U.S. PATENT DOCUMENTS

| | | | |
|---|---|---|---|
| 2001/0036349 A1* | 11/2001 | Abe | C03C 13/045 385/124 |
| 2003/0063878 A1* | 4/2003 | Matsuo | C03B 37/014 385/123 |
| 2003/0091308 A1 | 5/2003 | Uchiyama | |
| 2005/0089289 A1* | 4/2005 | Hayami | G02B 6/03688 385/127 |
| 2006/0039665 A1* | 2/2006 | Matsuo | G02B 6/02009 385/127 |
| 2007/0137256 A1 | 6/2007 | Barish | |
| 2008/0192239 A1 | 8/2008 | Otosaka | |
| 2014/0352361 A1* | 12/2014 | Dawes | C03B 37/01453 65/397 |
| 2015/0331180 A1 | 11/2015 | Oyamada | |
| 2016/0289113 A1 | 10/2016 | Yoshida | |
| 2017/0176673 A1* | 6/2017 | Berkey | C03C 3/06 |

FOREIGN PATENT DOCUMENTS

| | | |
|---|---|---|
| JP | 2003054976 A | 2/2003 |
| JP | 2003206152 A | 7/2003 |
| JP | 2005308717 A | 11/2005 |
| JP | 2006292843 A | 10/2006 |
| JP | 2013234078 A | 11/2013 |
| JP | 2014142613 A | 8/2014 |
| JP | 2016196388 A | 11/2016 |

* cited by examiner

METHOD OF MEASURING OPTICAL FIBER PREFORM

The contents of the following Japanese and International patent applications are incorporated herein by reference:
No. 2018-183352 filed in JP on Sep. 28, 2018; and
PCT/IB2019/058290 filed in WO on Sep. 30, 2019

BACKGROUND

1. Technical Field

The present invention relates to a method of measuring an optical fiber preform.

2. Related Art

An optical fiber preform becomes an optical fiber by drawing the optical fiber preform to reduce a diameter thereof. An optical fiber preform of an optical fiber for communication has a core portion having a relatively high refractive index and a clad portion arranged on an outer periphery of the core portion and having a relatively low refractive index. When manufacturing the optical fiber preform by a VAD method, a core-depositing burner for depositing a core portion and a clad-depositing burner for depositing a clad portion on an outer side of a core may be provided and used at the same time, in some cases.

In recent years, demand for optical fibers is increasing with an increase in data traffic. For this reason, in order to meet the increasing demand, it is required to increase a size of the optical fiber preform. As methods of increasing the size of the preform, there is a method of increasing flow rates of a raw material and a flammable gas to be supplied to the core-depositing burner and the clad-depositing burner.

In the meantime, important parameters that determine optical characteristics of the optical fiber include a ratio of a diameter of the core portion and a diameter of the clad portion. This ratio highly influences a mode field diameter and the like of the optical fiber. For this reason, also in a stage of the optical fiber preform, it is needed to perceive the ratio of the diameter of the core portion and the diameter of the clad portion, and a variation in the ratio in a longitudinal direction of the optical fiber preform, in more detail.

As means for measuring an outer diameter of the core portion of the optical fiber preform, there is a method of measuring a refractive index distribution by using a preform analyzer. The preform analyzer is configured to use laser light of a point source light to sweep the laser light to a side surface of the preform. For this reason, it takes time to measure the diameter of the core portion. Therefore, suggested is a method of measuring a refractive index distribution of an optical fiber preform in a short time (refer to Patent Document 1). Patent Document 1: Japanese Patent Application Publication No. 2005-308717

The method disclosed in Patent Document 1 includes applying parallel light from a side surface of the preform to measure an intensity distribution of transmitted light of the optical fiber preform. According to this method, it is possible to obtain a relative value of the diameter of the core portion in a shorter time than the preform analyzer.

Since an outer diameter of the preform can be measured in a short time by using a laser outer diameter measuring device, it is possible to obtain a non-circularity of the core portion in a short time, based on relative values of the diameter of the core portion measured from a plurality of circumferential angles in the same section of the optical fiber preform by using the method of Patent Document 1. However, it is turned out that a ratio of a measured value measured by the method disclosed in Patent Document 1 and a measured value measured using the preform analyzer is not constant in the longitudinal direction of the preform with respect to an outer diameter ratio, which is a ratio to the outer diameter of the core portion, in some cases.

General Disclosure

An aspect of the present invention provides a method of measuring a diameter of a core portion of an optical fiber preform including the core portion having a relatively high refractive index and a clad portion having a relatively low refractive index, the method comprising preparing an optical fiber preform where when, in a section which extends from the core portion to the clad portion and in which a refractive index changes in a radial direction of the optical fiber preform, a refractive index of the clad portion is set as a reference refractive index ratio of 0.0 and a maximum value of a refractive index of the core portion is set as a refractive index ratio of 1.0, in the radial direction of the optical fiber preform, an absolute value of a ratio of a difference between a refractive index of the optical fiber preform at a first position at which the refractive index ratio is 0.25 and a refractive index of the optical fiber preform at a second position at which the refractive index ratio is 0.75 to a spacing (mm) between the first position and the second position is equal to or greater than 0.0015(/mm) when calculated according to Formula 1; applying parallel light to the optical fiber preform, and measuring the diameter of the core portion from an image captured by receiving light having transmitted through the optical fiber preform.

$$R = \left| \frac{n_{0.75} - n_{0.25}}{r_{0.75} - r_{0.25}} \right| \qquad \text{formula 1}$$

where:
[R] indicates the absolute value of the ratio of the difference between the refractive indexes to the spacing;
[$r_{0.25}$] indicates the first position by a distance (mm) from a center of the optical fiber preform;
[$n_{0.25}$] indicates the refractive index of the optical fiber preform at the first position,
[$r_{0.75}$] indicates the second position by a distance (mm) from the center of the optical fiber preform; and
[$n_{0.75}$] indicates the refractive index of the optical fiber preform at the second position.

Hereinafter, the present invention will be described through embodiments of the invention. However, the following embodiments do not limit the invention defined in the claims. Also, all combinations of features described in the embodiments are not necessarily essential to solutions of the invention.

DESCRIPTION OF EXEMPLARY EMBODIMENTS

Figure 1:
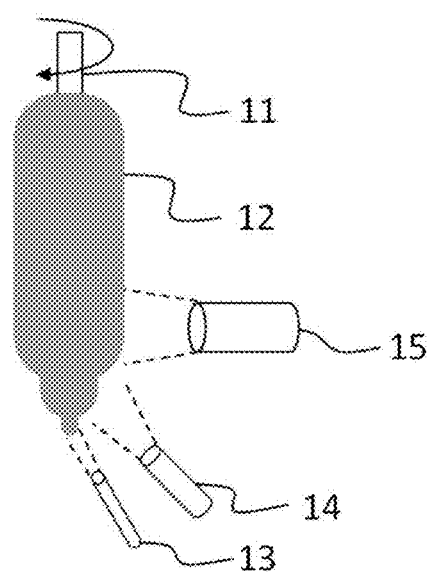
FIG. 1 is a schematic view illustrating a method of manufacturing a glass particle deposit 12.

FIG. 1 is a schematic view illustrating a method of manufacturing a glass particle deposit 12 becoming an optical fiber preform. As shown in FIG. 1, the glass particle deposit 12 is manufactured by depositing, in the vicinity of a lower end of a start material 11, glass particles ejected from a core-portion-depositing burner 13, a first clad-portion-depositing burner 14, and a second clad-portion-depositing burner 15.

FIG. 1 also shows burner positions when manufacturing the glass particle deposit 12. The core-portion-depositing burner 13 is arranged at the lowest part, independently of the first clad-portion-depositing burner 14 and the second clad-portion-depositing burner 15. The core-portion-depositing burner 13 is configured to form a core portion of the glass particle deposit 12 by ejecting flame accompanied by a dopant raw material such as germanium tetrachloride, in addition to silicon tetrachloride as a glass raw material.

The first clad-portion-depositing burner 14 and the second clad-portion-depositing burner 15 are arranged at places higher than the core-portion-depositing burner 13, and are configured to form a clad portion such that the clad portion covers, from an outer side, the core portion deposited on the start material 11 by the core-portion-depositing burner 13. In this way, the glass particle deposit 12 is manufactured as a whole by using the plurality of burners. The manufactured glass particle deposit 12 is heated and dehydrated in a furnace core tube including chlorine gas, for example, and is then further heated to be a clear glass in the furnace core tube in a helium gas atmosphere, so that an optical fiber preform is obtained.

Figure 2:
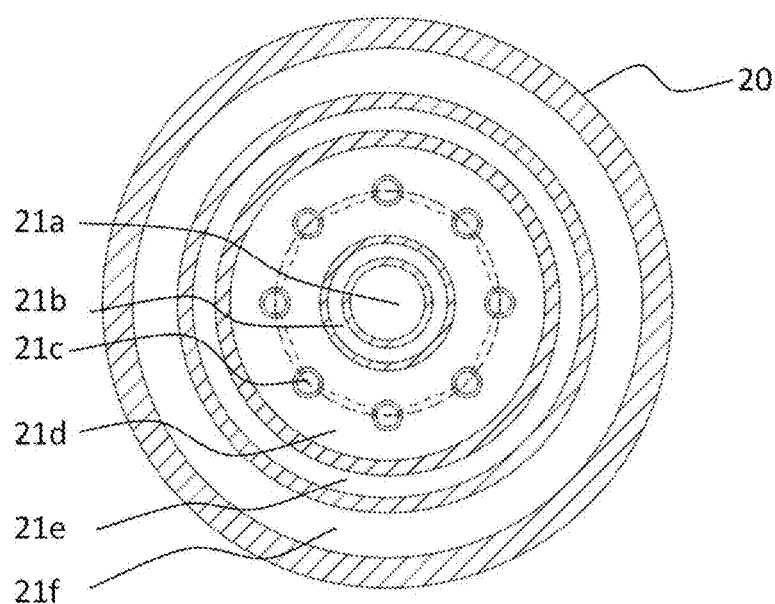
FIG. 2 is a schematic sectional view showing a structure of a burner 20.

FIG. 2 is a schematic sectional view showing a structure of a burner 20 that can be used as the first clad-portion-depositing burner 14 and the second clad-portion-depositing burner 15. The shown burner 20 has a plurality of ejection ports 21a, 21b, 21d, 21e, 21f arranged in a concentric shape and a small-diameter ejection port group 21c, and is configured to eject a flammable gas, an oxygen gas, a shield gas and the like at the same time.

Note that, the first clad-portion-depositing burner 14 and the second clad-portion-depositing burner 15 are configured to also play other roles than deposition of the clad portion. For example, they are configured to bake the core portion by flame to increase a density, thereby preventing cracking of the glass particle deposit 12. In addition, they are configured to bake the core portion to reduce a diameter of the core, thereby preventing reattachment of germanium oxide particles that are floating without attaching to the glass particle deposit 12. Further, they are configured to increase a temperature of the core portion by flame, thereby volatilizing extra germanium oxide.

EXAMPLE 1

The glass particle deposit 12 was manufactured using the equipment shown in FIGS. 1 and 2. The core-portion-depositing burner 13 was supplied with oxygen 9.3 L/minute, hydrogen 6.8 L/minute, argon 0.38 L/minute, silicon tetrachloride 0.46 L/minute and germanium tetrachloride 17 mL/minute.

The ejection port 21a of the burner 20 used as the first clad-portion-depositing burner 14 was supplied with silicon tetrachloride 0.80 L/minute and oxygen 0.66 L/minute. In addition, the ejection port 21d was supplied with hydrogen 32 L/minute, the ejection port 21f was supplied with oxygen 18 L/minute, and the small-diameter ejection port group 21c was supplied with a total flow rate of oxygen 1.5 L/minute.

The ejection port 21a of the burner 20 used as the second clad-portion-depositing burner was supplied with silicon tetrachloride 4.8 L/minute and oxygen 3.6 L/minute. In addition, the ejection port 21d was supplied with hydrogen 65 L/minute, the ejection port 21f was supplied with oxygen 31 L/minute, and the small-diameter ejection port group 21c was supplied with a total flow rate of oxygen 6.2 L/minute.

The glass particle deposit 12 manufactured according to the above conditions was heated to around 1,200° C. and dehydrated in the furnace core tube including chlorine gas. Thereafter, the glass particle deposit 12 was further heated to around 1,500° C. to be a clear glass in the furnace core tube in the helium gas atmosphere. In this way, the optical fiber preform was obtained.

For the optical fiber preform manufactured according to the above conditions, a refractive index distribution was measured using a preform analyzer at a cylindrical part having a generally stable diameter, except tapered portions at both ends in a longitudinal direction. As a result, it was found that the diameter of the core portion was 22.0 mm. In a radial direction of the optical fiber preform, a value of a ratio R obtained at the position at which a refractive index ratio is 0.25 and at the position at which the refractive index ratio is 0.75 was 0.00167(1/mm). Here, the refractive index ratio and the ratio R are defined as follows.

Figure 3:
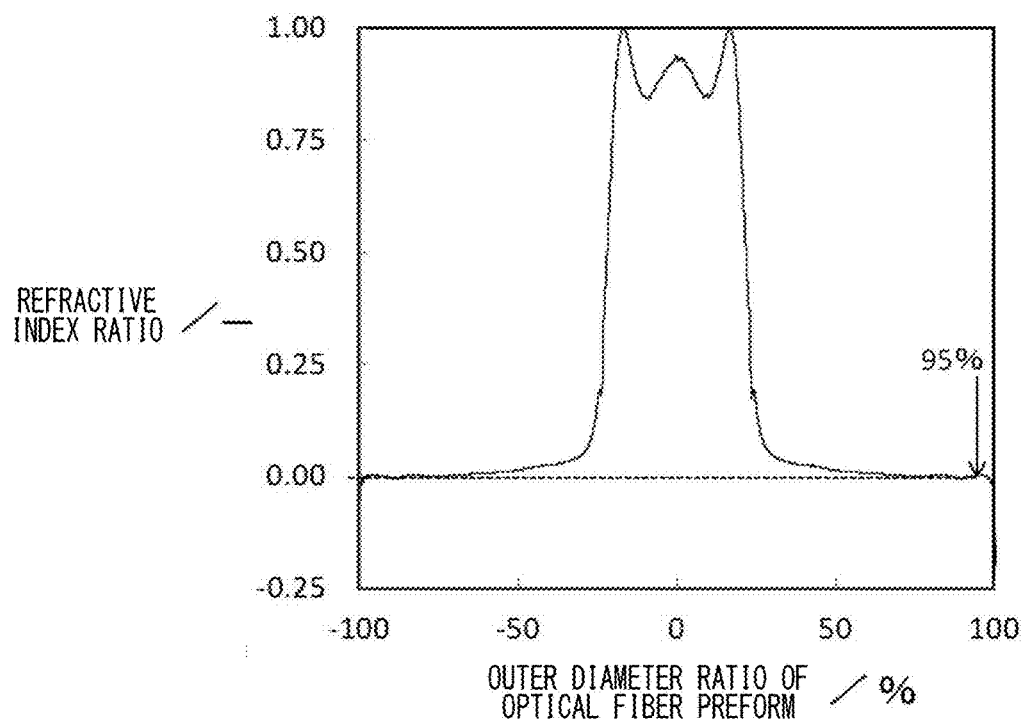
FIG. 3 illustrates a concept of a refractive index ratio of an optical fiber preform.

FIG. 3 illustrates a concept of a refractive index ratio of an optical fiber preform. FIG. 3 shows a refractive index distribution in the radial direction of the optical fiber preform. Here, the refractive index ratio is a relative value where the refractive index of the clad portion having a relatively low refractive index is set as a reference of 0.0 and a maximum value of the refractive index of the core portion having a relatively high refractive index is set as 1.0. The refractive index of the clad portion was defined as a refractive index at a position at which an outer diameter ratio, which is a ratio to an outer diameter in the radial direction of the optical fiber preform, is equivalent to 95%.

Figure 4:
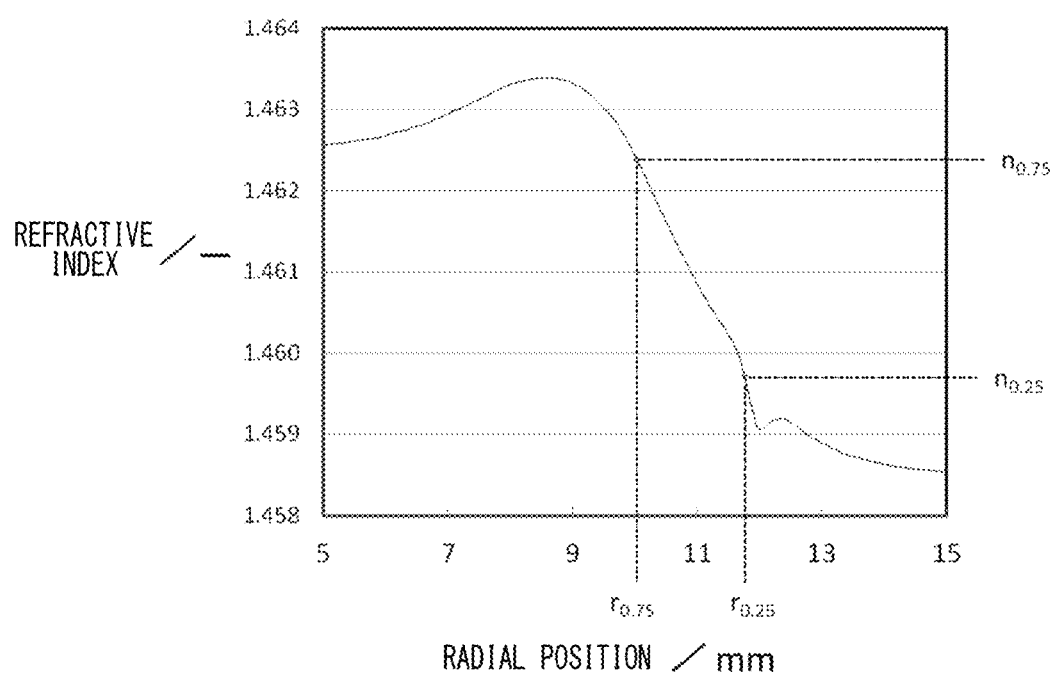
FIG. 4 is a graph showing a change in refractive index ratio in a radial direction of the optical fiber preform.

FIG. 4 is a graph showing a change in refractive index ratio in a section including a boundary between the core portion and the clad portion in the radial direction of the optical fiber preform. As used herein, the "boundary between the core portion and the clad portion" means a section between a position at which the refractive index ratio of the optical fiber preform is 0.75 and a position at which the refractive index ratio is 0.25, in the radial direction of the optical fiber preform. The radial position means a distance from a center of the optical fiber preform, in the radial direction of the optical fiber preform.

The ratio R of the optical fiber preform is a value defined by Formula 1.

$$R = \left| \frac{n_{0.75} - n_{0.25}}{r_{0.75} - r_{0.25}} \right| \qquad \text{formula 1}$$

where:
[R] indicates an absolute value of a ratio of a difference between refractive indexes to a spacing (mm);
[$r_{0.25}$] indicates the first position by a distance (mm) from the center of the optical fiber preform;
[$n_{0.25}$] indicates the refractive index of the optical fiber preform at the first position;
[$r_{0.75}$] indicates the second position by a distance (mm) from the center of the optical fiber preform; and
[$n_{0.75}$] indicates the refractive index of the optical fiber preform at the second position.

As shown in FIG. 4, a curve indicative of a change in refractive index ratio in the radial direction of the optical fiber preform includes an inflection point on an outer side of the boundary between the core portion and the clad portion. For this reason, the refractive index that decreases from the core portion toward the clad portion for the entire optical fiber preform increases at a position of the inflection point.

The inflection point of the refractive index ratio can be formed by adjusting a gas flow rate of the first clad-portion-depositing burner 14. For example, a ratio of a flammable gas or a combustion supporting gas to the glass raw material such as silicon tetrachloride is preferably adjusted larger. Providing such a refractive index increase region allows for easily adjusting optical characteristics of an optical fiber manufactured by drawing the optical fiber preform to levels equivalent to those achieved conventionally.

Furthermore, in the present Example, for the optical fiber preform, the diameter of the core portion was measured using parallel light. In a state where the optical fiber preform was immersed in matching oil, a size measuring device LS-9030D using green LED parallel light available from KEYENCE CORPORATION was used. The parallel light was applied from a side surface of the optical fiber preform, and a light intensity distribution was measured from an image captured by receiving the light having transmitted through the optical fiber preform. A spacing between two dark portions of the measured light intensity distribution was set as a core portion equivalent diameter(a relative value of the core portion diameter) of the optical fiber preform, and the core portion equivalent diameter was repeatedly measured at each position at a pitch of 1 mm in the longitudinal direction of the optical fiber preform.

For the same optical fiber preform, the refractive index distribution was measured at intervals of 20 to 100 mm in the longitudinal direction by using the preform analyzer, a half value width of the refractive index of the core portion was set as the diameter of the core portion, and the measurement result was compared with the above Example.

Figure 5:
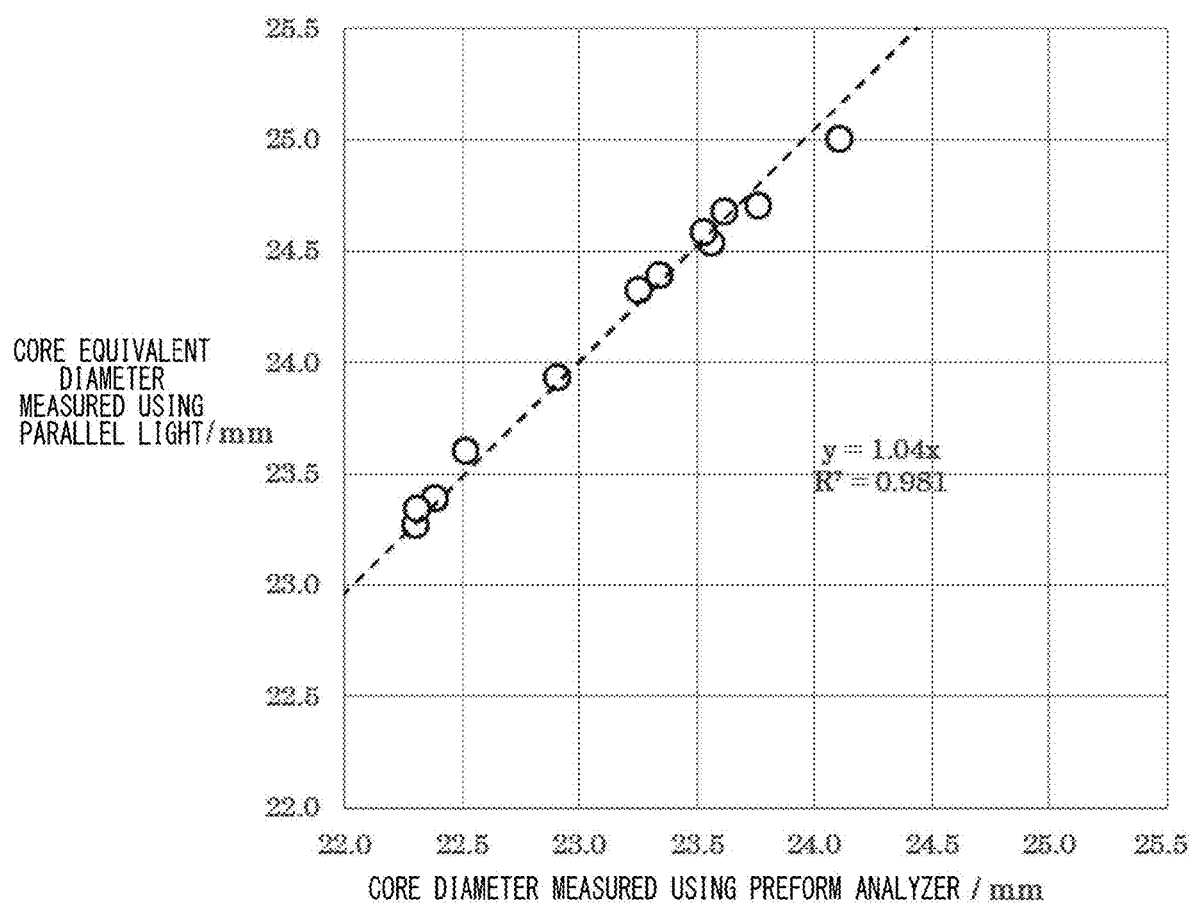
FIG. 5 is a view showing a comparison between measurement results of a core portion equivalent diameter.

FIG. 5 is a view showing a comparison between values of the core portion equivalent diameter measured using the parallel light and a measurement result of the diameter of the core portion using the preform analyzer. As shown, the ratios of the values of the measurement results by the different measurement methods were 1.04, which was substantially the same.

Figure 6:
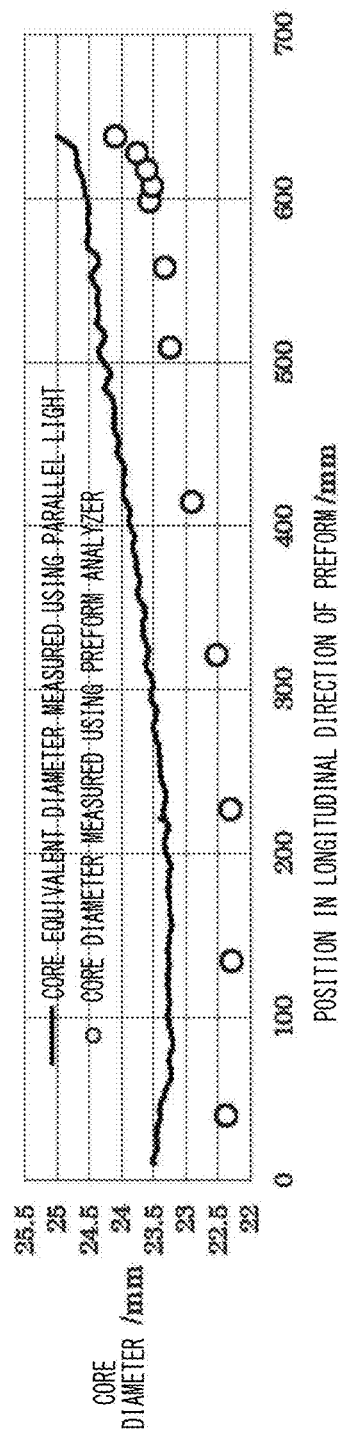
FIG. 6 is a view showing a comparison between measurement results of the core portion equivalent diameter.

FIG. 6 is a view showing a comparison between the core diameters measured in the longitudinal direction of the optical fiber preform by different measurement methods. As shown, also in the longitudinal direction of the optical fiber preform, the measurement result obtained using the parallel light and the measurement result obtained using the preform analyzer were almost the same, and it was found that the measurement using the parallel light can achieve a measurement result comparable to the measurement result obtained using the preform analyzer, for the optical fiber preform whose diameter of the core portion exceeds 23 mm.

EXAMPLE 2

A glass particle deposit was manufactured using the same equipment as that in Example 1. The core-portion-depositing burner 13 was supplied with oxygen 8.9 L/minute, hydrogen 6.7 L/minute, argon 0.40 L/minute, silicon tetrachloride 0.41 L/minute and germanium tetrachloride 20 mL/minute.

The ejection port 21a of the first clad-portion-depositing burner 14 was supplied with silicon tetrachloride 0.91 L/minute and oxygen 0.68 L/minute, the ejection port 21d was supplied with hydrogen 34 L/minute, the ejection port 21f was supplied with oxygen 18 L/minute, and the small-diameter ejection port group 21c was supplied with a total flow rate of oxygen 1.4 L/minute. The ejection port 21a of the second clad-portion-depositing burner 15 was supplied with silicon tetrachloride 5.4 L/minute and oxygen 3.5 L/minute, the ejection port 21d was supplied with hydrogen 70 L/minute, the ejection port 21f was supplied with oxygen 30 L/minute, and the small-diameter ejection port group 21c was supplied with a total flow rate of oxygen 6.3 L/minute.

The manufactured glass particle deposit was heated to around 1,200° C. and dehydrated in the furnace core tube including chlorine gas. Thereafter, the glass particle deposit was further heated to around 1,500° C. to be a clear glass in the furnace core tube in the helium gas atmosphere, so that an optical fiber preform was manufactured.

For the optical fiber preform manufactured according to the above conditions, a refractive index distribution was measured using a preform analyzer at a cylindrical part having a generally stable diameter, except tapered portions at both ends in a longitudinal direction. As a result, the refractive index distribution showed following features. That is, the value of the ratio R, which was also calculated in Example 1, was 0.00149(1/mm). Also, the core equivalent diameter was 21.6 mm.

The parallel light was applied from a side surface of the same optical fiber preform, and a light intensity distribution was measured from an image captured by receiving the light having transmitted through the optical fiber preform. A spacing between two dark portions of the light intensity distribution could be set as a core equivalent diameter of the optical fiber preform, and a ratio of diameters of the core portion and the clad portion of the optical fiber preform manufactured in Example 2 could be easily measured.

COMPARATIVE EXAMPLE 1

An optical fiber preform according to Comparative Example 1 was manufactured using the same equipment as that in Example 1. The core-portion-depositing burner 13 was supplied with oxygen 9.3 L/minute, hydrogen 6.5 L/minute, argon 0.38 L/minute, silicon tetrachloride 0.44 L/minute and germanium tetrachloride 16 mL/minute.

The ejection port 21a of the first clad-portion-depositing burner 14 was supplied with silicon tetrachloride 0.80 L/minute and oxygen 0.66 L/minute. The ejection port 21d was supplied with hydrogen 29 L/minute, the ejection port 21f was supplied with oxygen 15 L/minute, and the small-diameter ejection port group 21c was supplied with a total flow rate of oxygen 3.0 L/minute. Also, the ejection port 21a of the second clad-portion-depositing burner 15 was supplied with silicon tetrachloride 4.8 L/minute and oxygen 3.6 L/minute, the ejection port 21d was supplied with hydrogen 63 L/minute, the ejection port 21f was supplied with oxygen 31 L/minute, and the small-diameter ejection port group 21c was supplied with a total flow rate of oxygen 6.2 L/minute.

The glass particle deposit 12 manufactured according to the above conditions was heated to around 1,200° C. and dehydrated in the furnace core tube including chlorine gas. Thereafter, the glass particle deposit was further heated to around 1,500° C. to be a clear glass in the furnace core tube in the helium gas atmosphere, so that an optical fiber preform was manufactured.

For the optical fiber preform manufactured according to the above conditions, a refractive index distribution was measured using a preform analyzer at a cylindrical part having a generally stable diameter, except tapered portions at both ends in a longitudinal direction.

Figure 7:
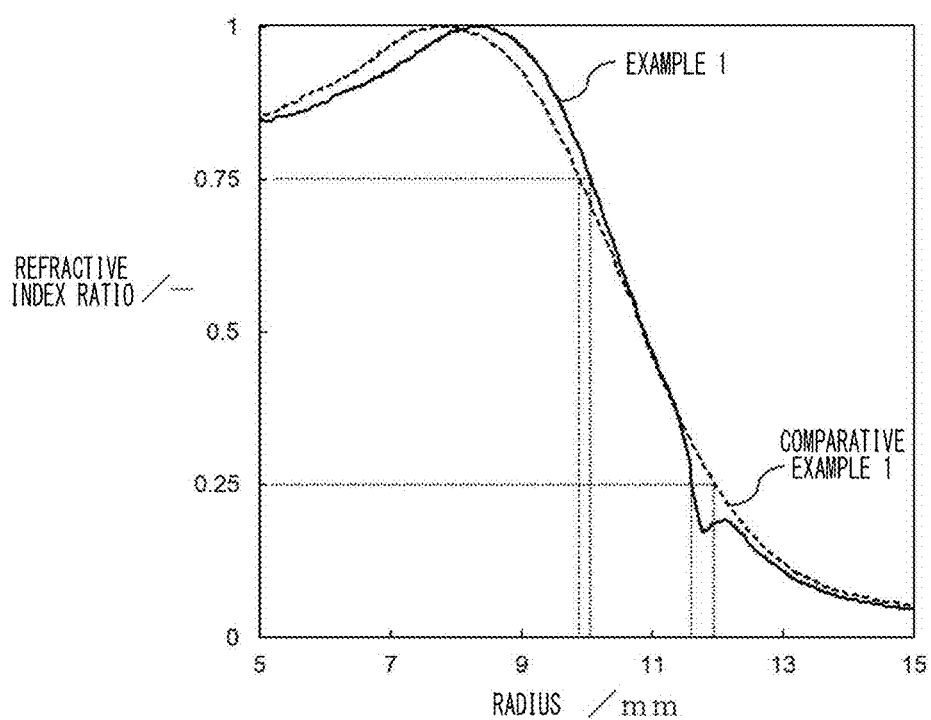
FIG. 7 is a graph showing a comparison between changes in refractive index ratio of optical fiber preforms.

FIG. 7 is a graph showing a comparison between a distribution of the refractive index ratios of the optical fiber preform according to Comparative Example 1 and a distribution of the refractive index ratios of the optical fiber preform according to Example 1. As shown, the refractive index ratio distributions are mutually different, reflecting the differences of the manufacturing conditions. The ratio R of the optical fiber preform according to Comparative Example 1 was 0.00113(1/mm).

The parallel light was applied from a side surface of the same optical fiber preform, and a light intensity distribution was measured from an image captured by receiving the light having transmitted through the optical fiber preform. A spacing between two dark portions of the light intensity distribution was set as a core equivalent diameter of the optical fiber preform. Also, the core equivalent diameter was measured at a plurality of places in the longitudinal direction of the optical fiber preform in a similar manner. The measurement result is shown in Table 1.

TABLE 1

| position in longitudinal direction (mm) | core portion diameter measured by preform analyzer (mm) | core portion equivalent diameter by parallel light measurement (mm) |
| --- | --- | --- |
| 50 | 21.4 | 22.5 |
| 60 | 21.8 | 22.8 |
| 70 | 22.1 | 22.9 |
| 100 | 21.8 | 22.8 |
| 150 | 22.1 | 22.9 |
| 239 | 21.9 | could not be measured |
| 328 | 22.0 | could not be measured |
| 417 | 22.2 | could not be measured |
| 506 | 22.6 | could not be measured |
| 595 | 22.9 | could not be measured |
| 645 | 23.0 | could not be measured |
| 685 | 23.1 | 23.5 |
| 695 | 23.1 | 23.5 |
| 705 | 23.4 | 23.6 |
| 715 | 23.7 | 23.8 |
| 735 | 24.9 | 23.8 |

As shown in Table 1, the above measurement method could not measure the core equivalent diameter of the optical fiber preform manufactured as Comparative Example, at some portions in the longitudinal direction.

Figure 8:
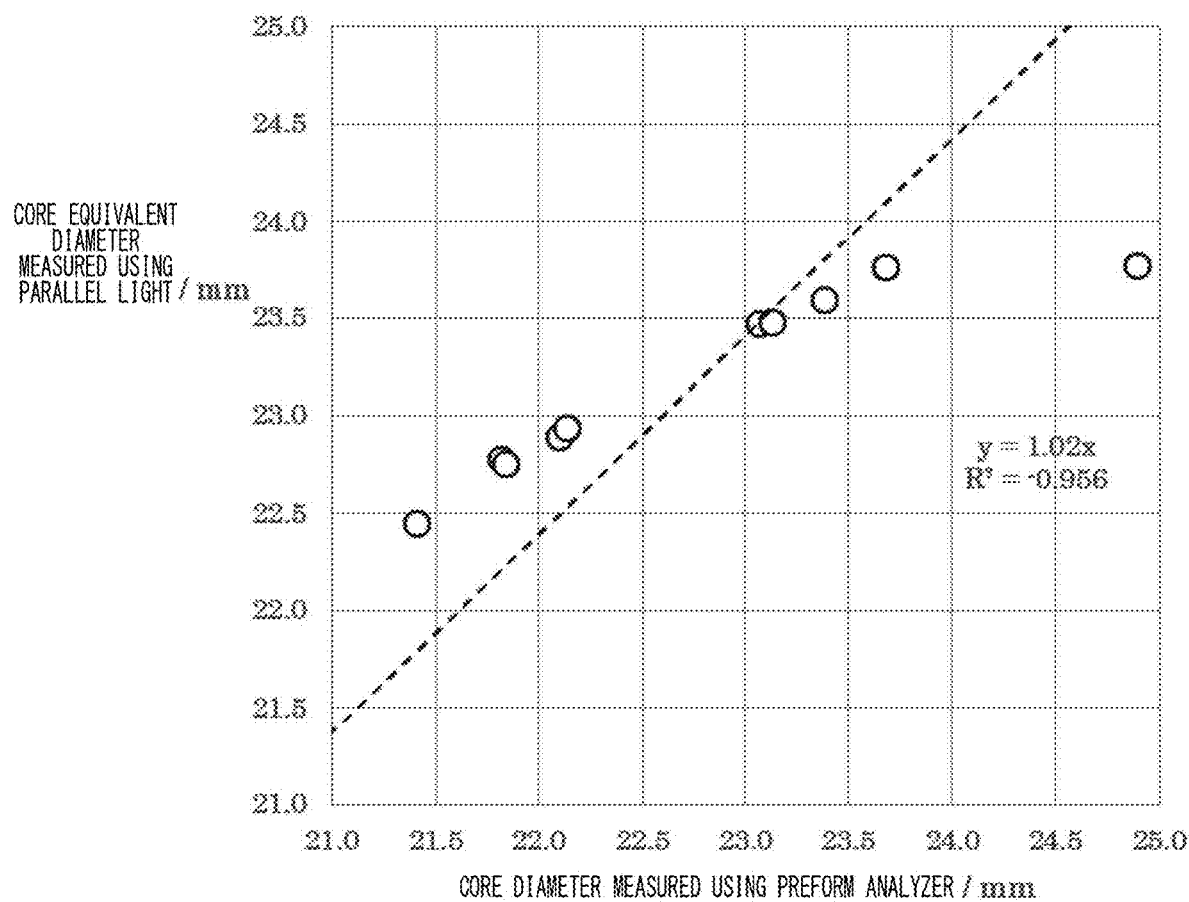
FIG. 8 is a graph showing a comparison between measurement results of the core portion equivalent diameter.

FIG. 8 is a graph showing a comparison between a measurement result of the core portion equivalent diameter obtained using the parallel light and a measurement result of the diameter of the core portion obtained using the preform analyzer for Comparative Example 1. As shown, the ratios of the values of the measurement results obtained by the different measurement methods varied in a range of 0.95 to 1.05, and were not constant in the longitudinal direction.

Other Embodiments and Other Comparative Examples

Additionally, a plurality of Examples and Comparative Examples where the ratios R are different was prepared, and it was examined whether it was possible to measure the core equivalent diameter by applying the parallel light. The results are summarized in Table 2.

TABLE 2

| | ratio R (/mm) | core equivalent diameter (mm) | whether core equivalent diameter could be measured |
| --- | --- | --- | --- |
| Example 1 | 0.00167 | 22.0 | could be measured |
| Example 2 | 0.00149 | 21.6 | could be measured |
| Example 3 | 0.00159 | 21.9 | could be measured |
| Example 4 | 0.00145 | 23.0 | could be measured |
| Example 5 | 0.00149 | 23.2 | could be measured |
| Comparative Example 1 | 0.00113 | 22.6 | couldn't be measured |
| Comparative Example 2 | 0.00105 | 24.1 | couldn't be measured |
| Comparative Example 3 | 0.00134 | 22.0 | couldn't be measured |

As shown, it can be seen that when the ratio R is equal to or greater than 0.0015, the effective core equivalent diameter can be measured from the transmitted light intensity distribution of the parallel light. Thereby, even when the core portion equivalent diameter is 22 mm or greater, it is possible to measure the core portion equivalent diameter of the large-sized and large-diameter optical fiber preform and to obtain the highly-reliable measurement result by the simple and rapid method of applying the parallel light.

As described above, when the diameter of the optical fiber preform becomes large, the ratio of the value of the core portion equivalent diameter measured by a method using the parallel light and the value of the core portion diameter measured using the preform analyzer may vary in some cases. In this case, when the measurement is performed using the preform analyzer, a tradeoff issue between lowering in measurement accuracy due to large measurement intervals in the longitudinal direction of the optical fiber preform and increase in measuring time due to small measurement intervals is inevitably caused.

However, according to the optical fiber preform of the above Examples, a relation between the measurement result of the core portion equivalent diameter by the parallel light and the measurement result of the core portion diameter by the preform analyzer is stable, so that it is possible to obtain the highly-reliable measurement result rapidly and easily. Therefore, it is possible to improve quality and productivity of the large-sized optical fiber preform, thereby improving the supply of the optical fiber.

EXPLANATION OF REFERENCE NUMERALS

11: start material, 12: glass particle deposit, 13: core-portion-depositing burner, 14: first clad-portion-depositing burner, 15: second clad-portion-depositing burner, 20: burner, 21a, 21b, 21d to 21f: ejection port, 21c: small-diameter ejection port group

What is claimed is:
1. A method of measuring a diameter of a core portion of an optical fiber preform including the core portion having a relatively high refractive index and a clad portion having a relatively low refractive index, the method comprising:

preparing an optical fiber preform where when, in a section which extends from the core portion to the clad portion and in which a refractive index changes in a radial direction of the optical fiber preform, a refractive index of the clad portion is set as a reference refractive index ratio of 0.0 and a maximum value of a refractive index of the core portion is set as a refractive index ratio of 1.0, in the radial direction of the optical fiber preform, an absolute value of a ratio of a difference between a refractive index of the optical fiber preform at a first position at which the refractive index ratio is 0.25 and a refractive index of the optical fiber preform at a second position at which the refractive index ratio is 0.75 to a spacing (mm) between the first position and the second position is equal to or greater than 0.0015 (/mm) when calculated according to Formula 1; and applying parallel light to the optical fiber preform, and measuring the diameter of the core portion from an image captured by receiving the light having transmitted through the optical fiber preform;

$$R = \left| \frac{n_{0.75} - n_{0.25}}{r_{0.75} - r_{0.25}} \right| \quad \text{formula 1}$$

where:

[R] indicates the absolute value of the ratio of the difference between the refractive indexes to the spacing;

[$r_{0.25}$] indicates the first position by a distance (mm) from a center of the optical fiber preform;

[$n_{0.25}$] indicates the refractive index of the optical fiber preform at the first position;

[$r_{0.75}$] indicates the second position by a distance (mm) from the center of the optical fiber preform; and

[$n_{0.75}$] indicates the refractive index of the optical fiber preform at the second position.

2. The method according to claim 1, wherein the optical fiber preform has a refractive index distribution where a curve indicative of a change in refractive index ratio in the radial direction of the optical fiber preform has an inflection point on an outermore side than the first position.

3. The method according to claim 1, wherein a core portion equivalent diameter of a part where the optical fiber preform is substantially cylindrical is 22 mm or greater in diameter.

4. The method according to claim 2, wherein a core portion equivalent diameter of a part where the optical fiber preform is substantially cylindrical is 22 mm or greater in diameter.

* * * * *